(12) United States Patent
Biel et al.

(10) Patent No.: US 9,491,996 B2
(45) Date of Patent: Nov. 15, 2016

(54) CONTAINER FOR ACCOMMODATING AN OPHTHALMIC LENS DURING A LENS TREATMENT PROCESS

(71) Applicant: Novartis AG, Basel (CH)

(72) Inventors: Roger Biel, Aschaffenburg (DE); Peter Hagmann, Erlenbach am Main (DE)

(73) Assignee: Novartis AG, Basel (CH)

(*) Notice: Subject to any disclaimer, the term of this patent is extended or adjusted under 35 U.S.C. 154(b) by 406 days.

(21) Appl. No.: 14/103,025

(22) Filed: Dec. 11, 2013

(65) Prior Publication Data

US 2014/0174956 A1    Jun. 26, 2014

Related U.S. Application Data

(60) Provisional application No. 61/737,352, filed on Dec. 14, 2012.

(51) Int. Cl.
*B65D 81/22* (2006.01)
*A45C 11/00* (2006.01)
(Continued)

(52) U.S. Cl.
CPC .......... *A45C 11/005* (2013.01); *B29D 11/0023* (2013.01)

(58) Field of Classification Search
CPC ..... A61L 2/26; A61L 12/086; A45C 11/005; B65D 2585/545
USPC ............... 220/23.4; 206/5.1, 210; 422/300; 134/184, 186, 137, 901
See application file for complete search history.

(56) References Cited

U.S. PATENT DOCUMENTS 3,621,855 A * 11/1971 Rabinowitz .......... A45C 11/005
    134/118
3,661,248 A * 5/1972 Isen .................... A45C 11/005
    134/137

(Continued)

FOREIGN PATENT DOCUMENTS

WO    2011045380 A1    4/2011
WO    2011045384 A1    4/2011

OTHER PUBLICATIONS

PCT International Search Report dated Mar. 7, 2014, International Application No. PCT/EP2013/076239, International Filing Date Dec. 11, 2013.

(Continued)

*Primary Examiner* — J. Gregory Pickett
*Assistant Examiner* — Niki M Eloshway
(74) *Attorney, Agent, or Firm* — Robert A. Ambrose

(57) ABSTRACT

A container (1) for accommodating an ophthalmic lens during a lens treatment process has a longitudinal axis (12) and comprises a containment portion (2), a mounting portion (3), and a retaining element (4). The containment portion (2) comprises a tubular section (21) and a bottom (22) protruding convexly towards the outside at one end of the tubular section (21) and has a number of apertures (23, 24). The mounting portion (3) comprises flow openings and an access opening (11) at an end remote from the containment portion (2). The retaining element (4) prohibits the lens from being washed out of the containment portion (2) and further permits access of a gripper into the containment portion (2) for insertion and removal of the lens. The mounting portion (3) extends from the access opening (11) to the tubular section (21) in a manner to enable introduction of the containment portion (2) of another such container (1) into the mounting portion (3) through the access opening (11).

19 Claims, 2 Drawing Sheets

(51) Int. Cl.
  *B29D 11/00* (2006.01)
  *A45C 11/04* (2006.01)

(56) References Cited

U.S. PATENT DOCUMENTS

| | | | | |
|---|---|---|---|---|
| 4,721,124 | A * | 1/1988 | Tuerkheimer | A45C 11/005 134/135 |
| 2010/0072082 | A1 * | 3/2010 | Kang | A45C 11/005 206/5.1 |
| 2011/0089053 | A1 | 4/2011 | Biel | |
| 2012/0126558 | A1 | 5/2012 | Lässig | |
| 2012/0152284 | A1 * | 6/2012 | Winterton | A45C 11/005 134/18 |
| 2013/0220855 | A1 * | 8/2013 | Markovitch | A61B 19/0287 206/363 |

OTHER PUBLICATIONS

PCT Written Opinion of the International Searching Authority dated Mar. 7, 2014, International Application No. PCT/EP2013/076239, International Filing Date Dec. 11, 2013.

* cited by examiner

CONTAINER FOR ACCOMMODATING AN OPHTHALMIC LENS DURING A LENS TREATMENT PROCESS

This application claims the benefit under 35 USC §119 (e) of U.S. provisional application Ser. No. 61/737,352 filed Dec. 14, 2012, incorporated herein by reference in its entirety.

FIELD

The present invention relates to a container for the accommodation of an ophthalmic lens during a treatment process.

BACKGROUND

Ophthalmic lenses, such as contact lenses, are generally manufactured in automated production processes. Depending on the lens materials used and according to the production method applied, the contact lenses must be immersed in treatment liquids such as extraction liquids, rinsing liquids, coating liquids, etc., to obtain the desired lens product which may be worn in direct contact with the wearer's eye. For that purpose it is known to transport the contact lenses through one or more baths containing such treatment liquid or liquids. To achieve this, for example several containers each containing a contact lens may be arranged in a transport carrier which is moved along the length of the bath such that the contact lenses contained in the respective containers are exposed to the treatment liquid of the bath. Movement of the transport carriers is performed such that the treatment liquid always flows around the contact lenses contained in the containers. The duration the contact lenses are exposed to the treatment liquid of a bath is given by the speed of movement of the transport carriers and by the length of the liquid bath (in the direction of transport). Of course, in a cyclic transport system the cycle time and the length of the liquid bath determine the duration of exposure of the contact lenses to the treatment liquid contained in the bath.

It is an object of the invention to improve efficiency of the treatment of ophthalmic lenses, in particular contact lenses such as soft contact lenses, in liquid baths. It is a further object of the invention to improve the processes and apparatuses used for the treatment of the lenses in liquid baths.

SUMMARY

The present invention suggests a container for accommodating an ophthalmic lens during a lens treatment process as it is specified in the independent claim directed to the container. The container has a longitudinal axis and comprises a containment portion, a mounting portion, and a retaining element. The containment portion comprises a tubular section and a bottom arranged at one longitudinal end of the tubular section of the containment portion. The bottom protrudes convexly towards the outside at one end of the tubular section to form a bottom end of the container and is provided with a number of apertures enabling a free flow of a treatment liquid into and out of the containment portion. The mounting portion comprises a plurality of flow openings allowing a treatment liquid to flow into and out of an inner space of the mounting portion. The mounting portion further comprises an access opening arranged at a longitudinal end of the mounting portion remote from the containment portion to form a top end of the container. The retaining element is arranged inside the leg portion at that end of the tubular section of the containment portion remote from the bottom. The retaining element prohibits the ophthalmic lens from being washed out of the containment portion and further permits access of a gripper through the access opening into the containment portion for insertion and removal of an ophthalmic lens. The mounting portion extends along the longitudinal axis of the container from the access opening to that end of the tubular section of the containment portion remote from the bottom in a manner so as to enable introduction of the containment portion of another such container into the mounting portion through the access opening.

In some embodiments of the container according to the invention, the mounting portion comprises a leg portion having a plurality of legs extending along the longitudinal axis of the container from the access opening to that end of the tubular section of the containment portion remote from the bottom. The flow openings are arranged between the legs of the leg portion.

In some embodiments of the container according to the invention, the tubular section of the containment portion has an outer diameter and the mounting portion or leg portion has an inner diameter, wherein the outer diameter of the containment portion is smaller than the inner diameter of the mounting portion or leg portion.

In some embodiments of the container according to the invention, the legs are arranged to conically taper from the access opening towards the end of the tubular section remote from the bottom.

In some embodiments of the container according to the invention each leg is provided with an end stop arranged at its longitudinal end remote from the containment portion.

In some embodiments of the container according to the invention the container comprises four legs circumferentially arranged around the longitudinal axis of the container at an equal distance from the longitudinal axis, with adjacent legs being arranged by an angular displacement of 90° relative to one another, and the end stops are designed such as to form four corners of a square.

In some embodiments of the container according to the invention at least two of the legs are provided with a resilient locking tab arranged beneath the end stop. In some embodiments of the container according to the invention the end stops are provided with a locking pin extending from the respective end stop in a direction towards the bottom end of the container.

In yet some further embodiments of the container according to the invention the apertures in the bottom of the container comprise bottom through-holes and longitudinal slots, the longitudinal slots extending from a transition of the bottom into the tubular section towards the retaining element.

In still some further embodiments of the container according to the invention, the retaining element comprises a diaphragm having flexible fins which extend from a circumferential, preferably cylindrical, portion of the retaining element towards a center of the diaphragm. The flexible fins are inclined towards the bottom of the container and are provided with fin through-holes enabling free passage of treatment liquid into an out of the containment portion.

In some embodiments of the container according to the invention the container comprises an annular shoulder at the transition from the mounting portion or leg portion to the containment portion of the container, and the circumferential, preferably cylindrical, portion of the retaining element rests against the annular shoulder.

In some embodiments of the container according to invention, the container further comprises a retainer ring for clamping the circumferential, preferably cylindrical, portion of the retaining element between the retainer ring and an inner wall section of the mounting portion or leg portion as well as between the retainer ring and the annular shoulder.

In some embodiments of the container according to the invention, the retainer ring comprises a circumferentially running inner tapered section for an abutment of the containment portion of another such container upon introduction into the leg portion.

Another aspect of the invention relates to a transport carrier assembly comprising at least two transport carriers arranged in a manner stacked one above the other, each transport carrier comprising an elongated web as well as two engagement portions capable of engaging with a transport device. One of the two engagement portions is arranged at one longitudinal end of the elongated web and the other one of the two engagement portions is arranged at the other end of the elongated web. Each transport carrier further comprises a plurality of adjacently arranged through-holes in the elongated web, with a container according to the invention being arranged in each of the through-holes of the elongated web of the respective transport carrier. At least two carriers are stacked one above the other in a manner such that the containment portion of each of the containers arranged in the through-holes of the web of the respective upper transport carrier is arranged in the mounting portion or leg portion of a corresponding container arranged in the through holes of the respective lower transport carrier.

In some embodiments of the transport carrier assembly according to the invention, the web of each of the transport carriers comprises locking recesses arranged in the web around the through-holes, the locking recesses being arranged such as to accommodate the locking pins of the containers extending from the respective end stops to secure the containers to the respective transport carrier.

BRIEF DESCRIPTION OF THE DRAWINGS

Embodiments of the container and transport carrier assembly according to the invention are described in more detail with reference to the accompanying drawings, in which.

DETAILED DESCRIPTION OF EMBODIMENTS

As used in this specification, the term "treatment liquid" or "treatment liquids" comprises any type of liquid to which the ophthalmic lens, in particular a contact lens such as a soft contact lens, is exposed in order to influence the physical or chemical properties of the lens. Without being exhaustive such treatment liquids may comprise extraction liquids, rinsing liquids, coating liquids, or any other type of liquid and in particular also may comprise water.

The term "along the longitudinal axis of the main body" is used to describe the general direction in which the mounting portion or the legs of the leg portion of the container extend. Although possible, the mounting portion or the legs do not have to run parallel to the longitudinal axis, and in particular the mounting portion or the legs of the leg portion is/are arranged slightly conically.

Figures 1, 2:
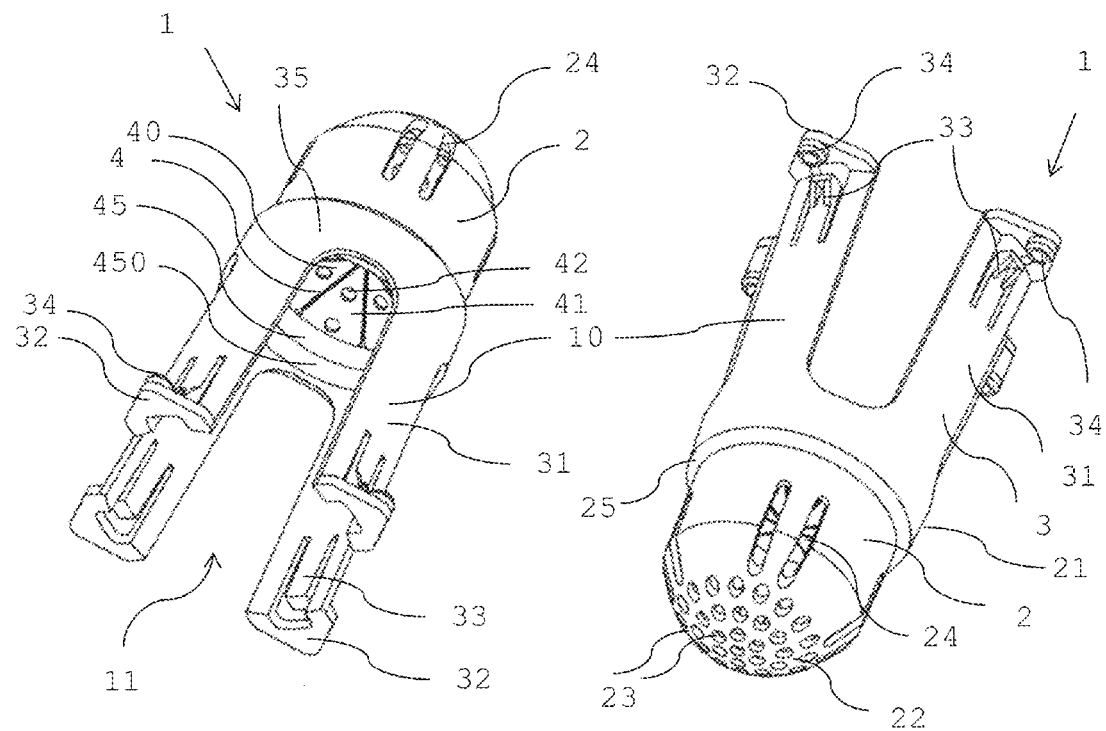
FIG. 1 is a perspective view of an embodiment of the container according to the invention, the container being turned upside down.
FIG. 2 is a perspective view of the container of FIG. 1 in its normal position.

FIG. 1 and FIG. 2 show perspective views of an embodiment of a container 1 according to the invention. The container 1 has an elongated body 10 comprising a containment portion 2 and a leg portion 3. Leg portion 3 is an advantageous embodiment of the mounting portion which could also be formed, for example, by a tubular wall having flow openings therein allowing the treatment liquid to enter into and exit an inner space of the mounting portion (this inner space of the mounting portion being surrounded by the tubular wall having the flow openings). However, for the sake of simplicity only the advantageous embodiment comprising the leg portion 3 will be described in the following. The container further comprises a retaining element 4 and a retainer ring 45 arranged inside body 10.

Containment portion 2 comprises a tubular section 21 and a bottom 22 which convexly protrudes towards the outside at one end of tubular section 21 to form a bottom end of container 1. Bottom 22 is provided with a number of through-holes 23 and slots 24, which extend from a transition of the bottom 22 into the tubular section 21 of the container 1 towards the retaining element 4. Through-holes 23 and slots 24 allow for an easy flow of treatment liquid into and out of containment portion 2 and around a lens contained therein (not shown in the drawings).

In the embodiment of the container shown, leg portion 3 essentially comprises four (resilient) legs 31 circumferentially arranged around the longitudinal axis 12 of the container 1 at an equal distance from the longitudinal axis 12. Adjacent legs 31 are arranged at an angular displacement of 90° relative to one another, and are each provided with an end stop 32 arranged at the longitudinal end of the respective leg 31 remote from containment portion 2. As can be seen in FIG. 1, end stops 32 are designed such as to form four corners of a square.

At the end remote from containment portion 22, legs 31 define an access opening 11 at the top end of container 1. A resilient locking tab 33 is arranged beneath each of the end stops 32. End stops 32 are further provided with a locking pin 34 extending from the respective end stop 32 towards the bottom end of container 1.

The radially extending end stops 32, the resilient locking tabs 33 and the locking pins 34 serve for secure attachment of the container 1 to a transport carrier as will be described in more detail below. The four end stops 32 essentially have a triangular shape to form the four edges of a square. This shape is advantageous with respect to an arrangement of a plurality of containers 1 next to each other in the rectangular-shaped web of a transport carrier. As can be easily understood, however, the number of legs 31 and the shape of the radially extending end stops 32 may vary without affecting their function.

In FIG. 1 the retaining element 4 is shown securely mounted inside the container 1. Retaining element 4 comprises diaphragm 40 having flexible fins 41 which extend from a circumferential cylindrical portion towards the center of the diaphragm. Flexible fins 41 are slightly inclined towards bottom 22 of the container and are provided with fin through-holes 42 enabling free passage of treatment liquid into and out of containment portion 2 accommodating the lens to be treated. A similar retaining element and its function are known from WO 2011/045384, the disclosure of which is incorporated by reference herein. Instead of the fins 41 narrow spokes may be provided to increase the flow of treatment liquid into and out of the containment portion as long as the spokes are adapted to securely retain the lens in the containment portion of the container during transport through the liquid.

Retaining element 4 separates the interior of leg portion 3 from containment portion 2 accommodating the lens. Leg portion 3 is laterally open between the legs 31 and is also open at the top end of container 1 by access opening 11. Containment portion 2, however, is essentially closed by tubular section 21, convex bottom 22 and retaining element 4, so that the lens accommodated therein cannot get lost during the transport through the one or more liquid baths while at the same time allowing the lens to freely float within containment portion 2 so as to be completely exposed to the treatment liquid of the respective bath.

Container 1 further comprises an annular shoulder 25 (see FIG. 2) at the transition from the leg portion 3 to the containment portion 2 of the container. The circumferential portion of retaining element 4 is arranged in the interior of container 1 and is securely clamped between a retainer ring 45 and an inner wall section 35 of leg portion 3 on one hand and between the retainer ring 45 and the annular shoulder 25 on the other hand. Thus, the separately manufactured retaining element 4 can be easily inserted into the interior of container 1 until it abuts against annular shoulder 25 and then secured at the desired position with the aid of the retainer ring 45.

Retainer ring 45 comprises two ring elements having different outer diameters. A first ring element has a first outer diameter corresponding essentially to the inner diameter of the circumferential portion of retaining element 4 and a second ring element which has a second outer diameter corresponding to the inner diameter of the inner wall section 35 of leg portion 3. In addition, the two ring elements of retainer ring 45 may be chamfered on their outer surfaces to facilitate insertion and alignment of the retainer ring during mounting.

Retainer ring 45 further has an inner circumferentially running tapered section 450 (see FIG. 1) which serves as an abutment for another container of the same type when being introduced into the leg portion 3 through access opening 11 to form a stacked arrangement. A transition portion from the bottom 22 to the tubular section 21 of the introduced container then comes to rest against tapered section 450 of the retainer ring 45 of the container to which it is introduced. This prevents damaging of the retaining element 4 on one hand, and at the other hand allows the introduced container to be introduced only to a position in which treatment liquid can still easily enter the containment portions 2 of the stacked containers in which the lenses to be treated are accommodated.

Such lenses can be introduced into and removed from the containment portion 22 of the respective container with the aid of a conventional gripper. For introduction of a lens into the containment portion, the gripper with the lens attached thereto is moved downwardly and the flexible fins 41 are bent downwardly towards bottom 22. Once the gripper has released the lens and has been retraced, the flexible fins 41 return to their original position, thus closing the containment portion and preventing the lens from escaping from the containment portion during the transport through the liquid bath.

The material from which diaphragm 40 is made is selected in accordance with the treatment liquids used for treatment of the contact lenses and also depending on the required mechanical (elastic) properties thereof. By way of example, a suitable material from which diaphragm 40 can be made is silicone.

Similarly, elongated body 10 of container 1 is made from a suitable material, preferably an injection-moldable plastic material such as a polyolefin, PET, or any other suitable material. By way of example, elongated body 10 is made from polypropylene. Retainer ring 45 is preferably made from the same material, for example polypropylene.

Figure 3:
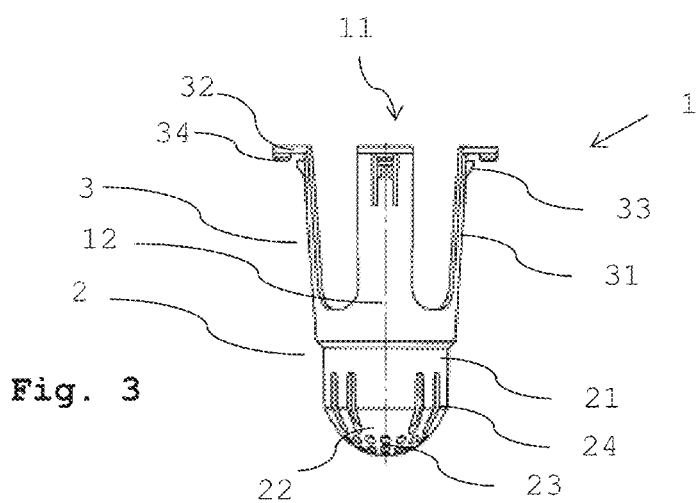
FIG. 3 is a side view of the container of FIG. 1.

FIG. 3 is a side view of the container 1 in which identical reference numbers are used for identical pieces. As can be seen, while the (resilient) legs 31 extend along the longitudinal axis they are conically tapering from the access opening 11 towards the end of tubular section 21 remote from the bottom 22. The slight conical taper of the legs is advantageous in that upon insertion of a container into a through-hole 51 of a transport carrier 5 from above (see FIG. 5), the legs 31 are in permanent contact with the interior wall of the carrier surrounding the through-hole 51. As the resilient locking tabs 33 slide over the interior wall of the through-holes 51 of the transport carrier 5 and the locking pins 34 enter corresponding recesses in the transport carrier, the resilient locking tabs 33 provide for a snap fit which locks the container 1 to the transport carrier 5 in the desired position. The snap fit can be easily released by pressing the resilient legs 3 inwardly thereby allowing for removal of the container 1 from the transport carrier 5 again.

Figure 4:
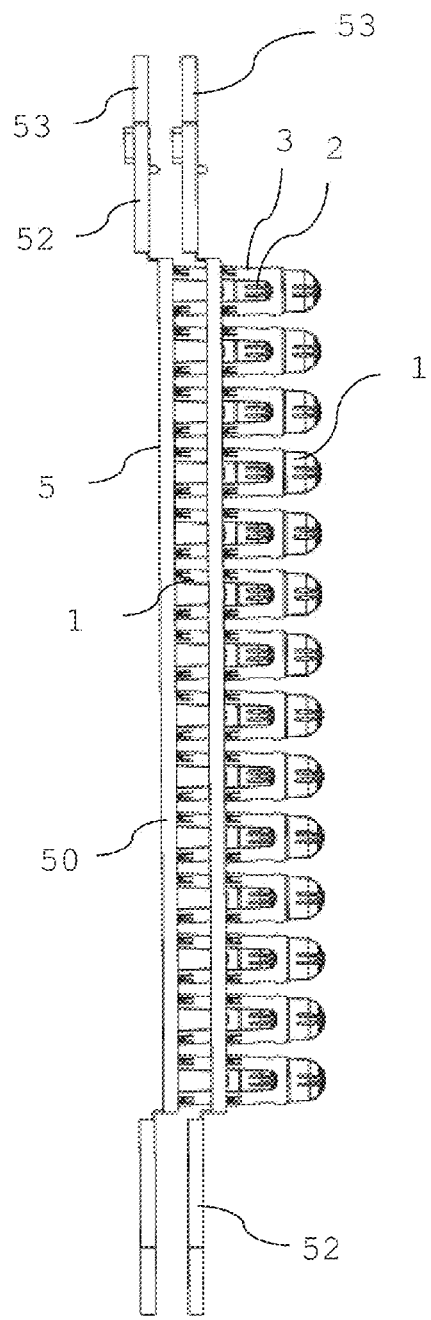
FIG. 4 is a side view of an embodiment of a transport carrier assembly according to the invention with two transport carriers stacked one above the other.
Figure 5:
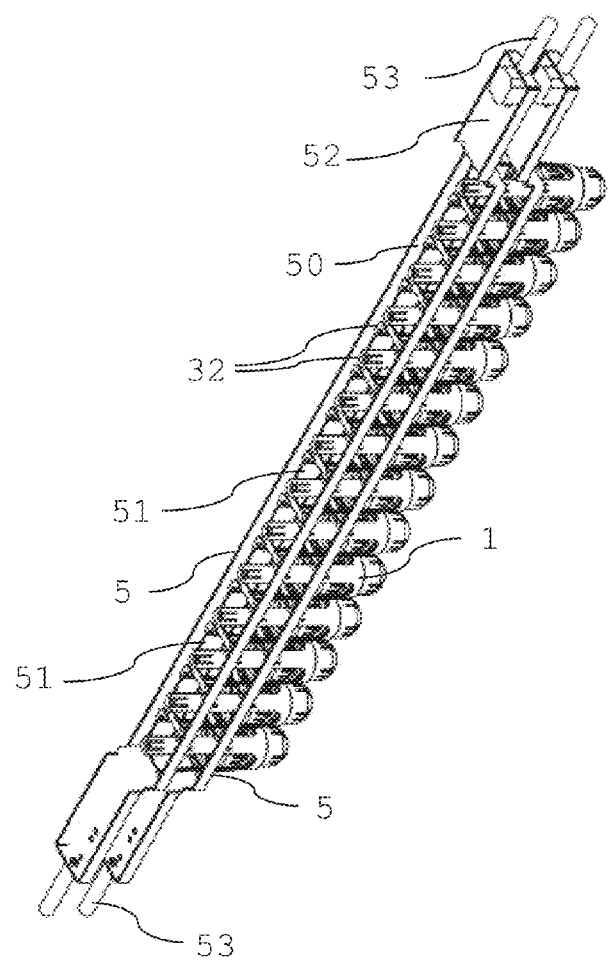
FIG. 5 is a perspective view of the transport carrier assembly of FIG. 4.

In FIG. 4 and FIG. 5 a transport carrier assembly comprising two transport carriers 5 stacked one above the other is shown. Each transport carrier 5 comprises an elongated web 50 and an end portion 52 as well as a rod 53 at each end of the elongated web 50. Each transport carrier 5 further comprises a plurality of through-holes 51 arranged in the elongated web, and in each of the through-holes 51 a container 1 as described hereinbefore is arranged fixedly mounted to the transport carrier in the manner explained above. The lowermost transport carrier 5 is supported at and transported with the aid of rods 53.

The radially extending triangular end stops 32 of the resilient legs 31 of the container 1 rest against the upper surface of elongated web 50 and prohibit the container 1 from slipping through the respective through-hole 51. The resilient locking tabs 33 right underneath the radially extending end stops 32 rest against the lower surface of the elongated web 50 (snap fit) and prevent the container from getting accidentally lifted away from the elongated web 50 during the movement through a liquid bath. The locking pins 34 extending downwardly from the end stops 32 engage in the corresponding locking recesses (not shown) arranged in the elongated web 50 around the through-holes 51 so that each container is arranged in a desired position and orientation to the respective elongated web 50.

As can be seen best in FIG. 4, the containers 1 of the upper transport carrier 5 are inserted into the leg portion of the containers 1 of the lower transport carrier such that the containment portion 2 of the respective container of the upper transport carrier 5 is completely inserted into the leg portion 3 of the respective container 1 of the lower transport carrier 5. However, as can also be seen in FIG. 4 the containment portion of the respective container 1 of the upper transport carrier 5 is arranged in the leg portion 3 of the respective container 1 of the lower carrier 5 such that access for the treatment liquid into the containment portion 2 of the container 1 of the upper transport carrier is easily possible through the slots formed between the legs 31 of the leg portion 3 of the respective lower container. In this regard, it is to be noted that in FIG. 4 only a part of the respective containment portion 2 of the containers 1 is visible.

The transport carrier assembly (piggy-back assembly) can be transported through the liquid bath essentially in a manner well-known in the art. In this regard, an apparatus suitable for this purpose is disclosed in WO 2011/045380, the disclosure of which is incorporated by reference herein. It goes without saying that it is within the scope of this invention to provide a carrier assembly with more than two carriers stacked one above the other.

Accordingly, the container according to the invention is stackable, that is to say another container of the same type can be introduced through the access opening at the longitudinal end of the mounting portion remote from the containment portion (i.e. at the top end of the container) into the mounting portion to form two containers stacked one above (and partially within) the other. At the same time, however, the liquid is still allowed to freely flow into and out of the containment portions of both containers so as to provide for a good exposure of the lenses contained in the containment portion of the container to the treatment liquid contained in the bath.

This provides for a plurality of advantages. For example, if the transportation speed of the containers containing the lenses remains unchanged and two stacked containers are transported through the liquid bath instead of one, the number of lenses that can be treated in the same period of time is twice as much as is conventional. In case of three stacked containers, the number of lenses that can be treated in the same period of time is three times as much as is conventional, and so on. Alternatively, if the number of lenses to be treated (i.e. the number of lenses transported through a bath) during a predetermined period of time is to remain unchanged, in case of two stacked containers it is possible to reduce the transportation speed to one half of the transportation speed of the conventional transportation speed. This may be advantageous in that the lenses are exposed to the treatment liquid for a period of time which is twice as much as is conventional. For example, in case of exposure of the lenses to an extraction liquid the completeness of extraction is thus further improved. Similar considerations hold for rinsing, coating and other treatment processes. In both cases (number of lenses to be treated in a predetermined period of time is increased, number of lenses to be treated in a period of time is unchanged but exposure time of the lenses to the liquid is increased) there is no need to make any constructional changes to the already existing apparatus.

As a still further alternative, in case the space consumption of a manufacturing line is to be decreased while the number of lenses to be treated in a predetermined period of time is to remain unchanged, the transportation speed may be decreased down to half of the transportation speed of the conventional apparatus and the length of the liquid bath (in the direction of transport) can be shortened down to one half of the length of the conventional liquid bath. Due to twice the number of lenses being transported with only half of the transportation speed they are exposed to the liquid contained in the bath for the same predetermined period of time as is conventional, so that the exposure time and the number of lenses treated within a predetermined period of time remain unchanged. However, the space needed by the liquid bath can be reduced to one half of the space of the conventional bath.

The mounting portion allows for a secure mounting of the container to a transport carrier with the aid of which a plurality of such containers each containing a lens can be transported through a liquid bath. The mounting portion allows the containers to be mounted to the transport carrier such that the containment portion may be immersed in a liquid while the transport carrier is not immersed in the liquid.

The container according to the invention is preferably reusable and can be used in a fully automated production processes for ophthalmic lenses such as, for example, soft contact lenses. The container is simple in construction and capable of being manufactured reproducibly in mass production processes, for example by injection molding. The container according to the invention enables an easy insertion into and removal of the ophthalmic lens from the containment portion of the container during the production process using automated grippers which are known in the art.

The leg portion allows for easy insertion (stacking) of another container through the access opening into the leg portion to form a stack of two containers.

The end stops allow for insertion of the container into a through-hole provided in a transport carrier until the end stops abut against the transport carrier so that the container is secured to the transport carrier.

The resilient locking tabs allow for an easy securing of the container to the transport carrier by insertion of the container through the through-hole of the carrier. The locking tabs then interact with corresponding locking ledges of the transport carrier. Thus a securely locked mounting of the container is ascertained.

The locking pins assist in a proper positioning of the end stops relative to the transport carrier so as to allow locking of the container to the transport carrier at a predetermined position only.

The bottom through holes and the longitudinal slots in the containment portion allow liquid to enter and exit the containment portion, with the lens freely floating in the liquid in the containment portion.

The flexible fins enable an easy insertion of a gripper or for the insertion and removal of an ophthalmic lens into or from the containment portion. Upon insertion of the gripper, the fins bend downwardly towards the bottom of the container. Due to their flexibility they move back to their original retaining position after the gripper has been withdrawn. The fin through-holes enable a free flow of liquid therethrough.

The retaining element is preferably produced separately. With the aid of the retainer ring and the annular shoulder the retaining element can be easily inserted into and securely held in place in the container.

Upon stacking of containers the retainer ring may act as an abutment or end stop for another container introduced through the access opening into the mounting portion or leg portion. Thus, another container can be introduced into the mounting portion or leg portion only to an extent such that liquid can enter into the containment portion of that container which is arranged inside the mounting portion or leg portion of the other container. In addition, due to limiting the extent to which the other container can be introduced into the mounting portion or leg portion, the retainer ring also protects the retaining element, especially the diaphragm, from getting damaged.

The locking recesses arranged around the through-holes in the web of the transport carrier provide for a secure locking of the respective containers to the transport carriers at a desired position and with a desired orientation of the containers.

While embodiments of the invention have been described with the aid of the drawings, various changes, modifications, and alternatives are conceivable without departing from the teaching underlying the invention. Therefore, the invention is not limited to the embodiment described but rather is defined by the scope of the appended claims.

The invention claimed is:

1. A container (1) for accommodating an ophthalmic lens during a lens treatment process, the container having a longitudinal axis (12) and comprising a containment portion (2), a mounting portion (3), and a retaining element (4),
wherein the containment portion (2) comprises a tubular section (21) and a bottom (22) arranged at one longitudinal end of the tubular section (21) of the containment portion (2), the bottom (22) protruding convexly towards the outside at one end of the tubular section (21) to form a bottom end of the container (1) and being provided with a number of apertures (23, 24) enabling a free flow of a treatment liquid into and out of the containment portion (2),
wherein the mounting portion (3) comprises a plurality of flow openings allowing a treatment liquid to flow into and out of an inner space of the mounting portion, the mounting portion further comprising an access opening (11) arranged at a longitudinal end of the mounting portion remote from the containment portion (2) to form a top end of the container (1),
and wherein the retaining element (4) is arranged inside the mounting portion (3) at that end of the tubular section (21) of the containment portion (2) remote from the bottom (22), the retaining element (4) prohibiting the ophthalmic lens from being washed out of the containment portion (2) and further permitting access of a gripper through the access opening (11) into the containment portion (2) for insertion and removal of an ophthalmic lens,
and wherein the mounting portion (3) extends along the longitudinal axis of the container from the access opening (11) to that end of the tubular section (21) of the containment portion (2) remote from the bottom (22) in a manner so as to enable introduction of the containment portion (2) of another such container (1) into the mounting portion (3) through the access opening (11), wherein the mounting portion (3) comprises a leg portion having a plurality of legs (31) extending along the longitudinal axis (12) of the container from the access opening (11) to that end of the tubular section (21) of the containment portion (2) remote from the bottom (22), with the flow openings being arranged between the legs (31) of the leg portion.

2. The container (1) according to claim 1, wherein the tubular section (21) of the containment portion (2) has an outer diameter and the mounting portion (3) or leg portion has an inner diameter, and wherein the outer diameter of the containment portion (2) is smaller than the inner diameter of the mounting portion (3) or leg portion.

3. The container (1) according to claim 2, wherein the legs (31) are arranged to conically taper from the access opening (11) towards the end of the tubular section (21) remote from the bottom (22).

4. The container (1) according to claim 1, wherein the tubular section (21) of the containment portion (2) has an outer diameter and the mounting portion (3) or leg portion has an inner diameter, and wherein the outer diameter of the containment portion (2) is smaller than the inner diameter of the mounting portion (3) or leg portion.

5. The container (1) according to claim 1, wherein each leg (31) is provided with an end stop (32) arranged at its longitudinal end remote from the containment portion.

6. The container (1) according to claim 5, comprising four legs (31) circumferentially arranged around the longitudinal axis (12) of the container (1) at an equal distance from the longitudinal axis (12), with adjacent legs (31) being arranged by an angular displacement of 90° relative to one another, wherein the end stops (32) are designed such as to form four corners of a square.

7. The container (1) according to claim 6, wherein at least two of the legs (31) are provided with a resilient locking tab (33) arranged beneath the end stop (32).

8. The container (1) according to claim 6, wherein the retaining element (4) comprises a diaphragm having flexible fins (41) which extend from a circumferential, portion of the retaining element (4) towards a center of the diaphragm, and wherein the flexible fins (41) are inclined towards the bottom (22) of the container and are provided with fin through-holes (42) enabling free passage of treatment liquid into an out of the containment portion (2).

9. The container (1) according to claim 8, wherein the container comprises an annular shoulder (25) at the transition from the mounting portion (3) or leg portion to the containment portion (2) of the container (1), and wherein the circumferential, preferably cylindrical, portion of the retaining element (4) rests against the annular shoulder (25).

10. The container (1) according to claim 5, wherein at least two of the legs (31) are provided with a resilient locking tab (33) arranged beneath the end stop (32).

11. The container (1) according to claim 5, wherein the end stops (32) are provided with a locking pin (34) extending from the respective end stop in a direction towards the bottom end of the container (1).

12. The container (1) according to claim 1, wherein each leg (31) is provided with an end stop (32) arranged at its longitudinal end remote from the containment portion.

13. The container (1) according to claim 1, wherein the apertures (23, 24) in the bottom (22) of the container (1) comprise bottom through-holes (23) and longitudinal slots (24), the longitudinal slots (24) extending from a transition of the bottom (22) into the tubular section (21) towards the retaining element (4).

14. The container (1) according to claim 1, wherein the retaining element (4) comprises a diaphragm having flexible fins (41) which extend from a circumferential, portion of the retaining element (4) towards a center of the diaphragm, and wherein the flexible fins (41) are inclined towards the bottom (22) of the container and are provided with fin through-holes (42) enabling free passage of treatment liquid into an out of the containment portion (2).

15. The container (1) according to claim 14, wherein the container comprises an annular shoulder (25) at the transition from the mounting portion (3) or leg portion to the containment portion (2) of the container (1), and wherein the circumferential, portion of the retaining element (4) rests against the annular shoulder (25).

16. The container (1) according to claim 15, further comprising a retainer ring (45) for clamping the circumferential, portion of the retaining element (4) between the retainer ring (45) and an inner wall section (35) of mounting portion (3) or leg portion as well as between the retainer ring (45) and the annular shoulder (25).

17. The container (1) according to claim 16, wherein the retainer ring (45) comprises a circumferentially running inner tapered section (450) for an abutment of the containment portion (2) of another such container upon introduction into the mounting portion (3) or leg portion.

18. A transport carrier assembly comprising at least two transport carriers (5) arranged in a manner stacked one above the other, each transport carrier (5) comprising an elongated web (50) as well as two engagement portions capable of engaging with a transport device, one of the two engagement portions being arranged at one longitudinal end of the elongated web (50) and the other one of the two engagement portions being arranged at the other end of the elongated web (50), each transport carrier (5) further comprising a plurality of adjacently arranged through-holes (51) in the elongated web (50), with a container (1) according to claim 1 being arranged in each of the through-holes (51) of the elongated web (50) of the respective transport carrier (5), and wherein the at least two carriers are stacked one above the other in a manner such that the containment portion (2) of each of the containers (1) arranged in the through-holes (51) of the web (50) of the respective upper transport carrier (5) is arranged in the mounting portion (3) or leg portion of a corresponding container (1) arranged in the through holes (51) of the respective lower transport carrier (5).

19. The transport carrier (5) assembly according to claim 18, wherein the web (50) of each of the transport carriers (5) comprises locking recesses arranged in the web (50) around the through-holes (51), the locking recesses being arranged such as to accommodate the locking pins (34) of the containers (1) extending from the respective end stops (32) to secure the containers (1) to the respective transport carrier (5).

* * * * *